(12) United States Patent
Arsalan

(10) Patent No.: US 12,535,051 B2
(45) Date of Patent: Jan. 27, 2026

(54) VERTICAL WIND TURBINE CONNECTED TO THE ROTATING TOWER

(71) Applicant: Arash Key Arsalan, Tehran (IR)

(72) Inventor: Arash Key Arsalan, Tehran (IR)

( * ) Notice: Subject to any disclaimer, the term of this patent is extended or adjusted under 35 U.S.C. 154(b) by 172 days.

(21) Appl. No.: 17/597,677

(22) PCT Filed: Jul. 18, 2019

(86) PCT No.: PCT/IB2019/056137
§ 371 (c)(1),
(2) Date: Jan. 18, 2022

(87) PCT Pub. No.: WO2021/009549
PCT Pub. Date: Jan. 21, 2021

(65) Prior Publication Data
US 2022/0381221 A1    Dec. 1, 2022

(51) Int. Cl.
*F03D 3/00* (2006.01)
*F03D 3/06* (2006.01)

(52) U.S. Cl.
CPC ............ *F03D 3/005* (2013.01); *F03D 3/061* (2013.01); *F05B 2240/9112* (2013.01); *F05B 2250/71* (2013.01)

(58) Field of Classification Search
CPC .. F03D 3/005; F03D 3/061; F05B 2240/9112; F05B 2250/71
See application file for complete search history.

(56) References Cited

U.S. PATENT DOCUMENTS

| | | | | |
|---|---|---|---|---|
| 372,148 | A * | 10/1887 | Henderson | F03D 3/00 415/4.2 |
| 4,722,665 | A * | 2/1988 | Tyson | F03B 3/04 416/85 |
| 8,177,481 | B2 * | 5/2012 | Liang | F03D 3/067 415/4.4 |
| 8,210,792 | B2 * | 7/2012 | Suma | H02S 10/12 415/126 |
| 8,487,468 | B2 * | 7/2013 | Christopher | H02K 7/1823 290/54 |

(Continued)

FOREIGN PATENT DOCUMENTS

| | | | | |
|---|---|---|---|---|
| CN | 102705167 | A * | 10/2012 | |
| EP | 2128439 | A1 * | 12/2009 | B60K 16/00 |
| WO | WO-2010071975 | A1 * | 7/2010 | E02D 27/42 |

OTHER PUBLICATIONS

Horst, Burg, "Wind power plant for generating electricity by wind energy with deflecting element", DPM, Sep. 2016 (Year: 2016).*

*Primary Examiner* — Nathaniel E Wiehe
*Assistant Examiner* — Joshua R Beebe

(57) ABSTRACT

In this invention, some unique blades are embedded which start from the top of the glass dome, extend around it and ending up below the dome plate. All of these blades are used to slow rotation of the tower. This vertical wind turbine, while rotating the structure to see the various views and landscapes around the tower, provides the electrical power required by the penthouse from wind power by the generator. Three blades are embedded in the top of the turbine, which is the upper part of the main blades. Lower and inside the container in roof of dome, the gearbox and generator are located to which harnessed energy by blades is transferred.

16 Claims, 3 Drawing Sheets

(56) References Cited

U.S. PATENT DOCUMENTS

| | | | |
|---|---|---|---|
| 8,614,523 B2* | 12/2013 | Reynolds | F03B 13/10 |
| | | | 290/55 |
| 9,328,717 B1* | 5/2016 | Walker | F03D 3/061 |
| 10,890,161 B1* | 1/2021 | Vemuri | F03D 9/007 |
| 2009/0047131 A1* | 2/2009 | Neumann | F03B 3/121 |
| | | | 416/132 R |
| 2011/0164977 A1* | 7/2011 | Vallejo | F03D 3/061 |
| | | | 416/223 R |
| 2011/0215585 A1* | 9/2011 | Caires | F03D 1/0675 |
| | | | 416/241 A |
| 2012/0183407 A1* | 7/2012 | Vallejo | F03D 3/064 |
| | | | 416/228 |
| 2012/0319403 A1* | 12/2012 | Fosdick | F03D 3/062 |
| | | | 290/52 |

\* cited by examiner

VERTICAL WIND TURBINE CONNECTED TO THE ROTATING TOWER

TECHNICAL FIELD

The technical field of this invention relates to the power generation by the wind turbine.

BACKGROUND ART

Wind turbine with stationary vertical support tower and airflow-directing shell, U.S. Pat. No. 7,733,039 is incorporated by reference herein. A wind turbine with a stationary tower and a set of turbine blades rotatably attached to the top and bottom of the tower.

A set of upper and lower braces connects the turbine blades to prevent any sag or skewing of the turbine blades as they rotate about the tower. The wind turbine may also include a stationary shell attached to the tower and inside the sweep of the turbine blades, to direct the airflow toward the turbine blades at the shell periphery, thereby improving overall performance and efficiency of the turbine.

The present invention differs with the claimed one in many ways.

Technical Problem

Wind energy exploitation for power generation is a common practice. However, turbines are usually installed as a separate structure and are not attractive aesthetically. On the other hand, the construction of the structure with a rotating upper part is not cost-effective and a lot of energy is required for its rotation.

Using wind energy by vertical turbines is always the best option in many locations, mainly because of cost-effective installation and maintenance, as well as simple installation in low elevation. At the same time, residents of a residential or commercial penthouse in 360-degree view can enjoy various aesthetically landscapes in minimum cost.

SUMMARY OF INVENTION

In this invention, some unique blades are embedded which start from the top of the glass dome, extend around it and ending up below the dome plate. All of these blades are used to slow rotation of the tower. This vertical wind turbine, while rotating the structure to see the various views and landscapes around the tower, provides the electrical power required by the penthouse from wind power by the generator.

Meanwhile, a gearbox can be used to convert low round to high round which is required generator, especially in low wind speed climates (The optimum speed for turbine rotation is one round per hour).

Advantageous Effects of Invention

Generation of energy required by penthouse to harness wind energy.
Construction of a rotating tower for enjoying 360 degree view using clean energy

DESCRIPTION OF EMBODIMENTS

Figure 1:
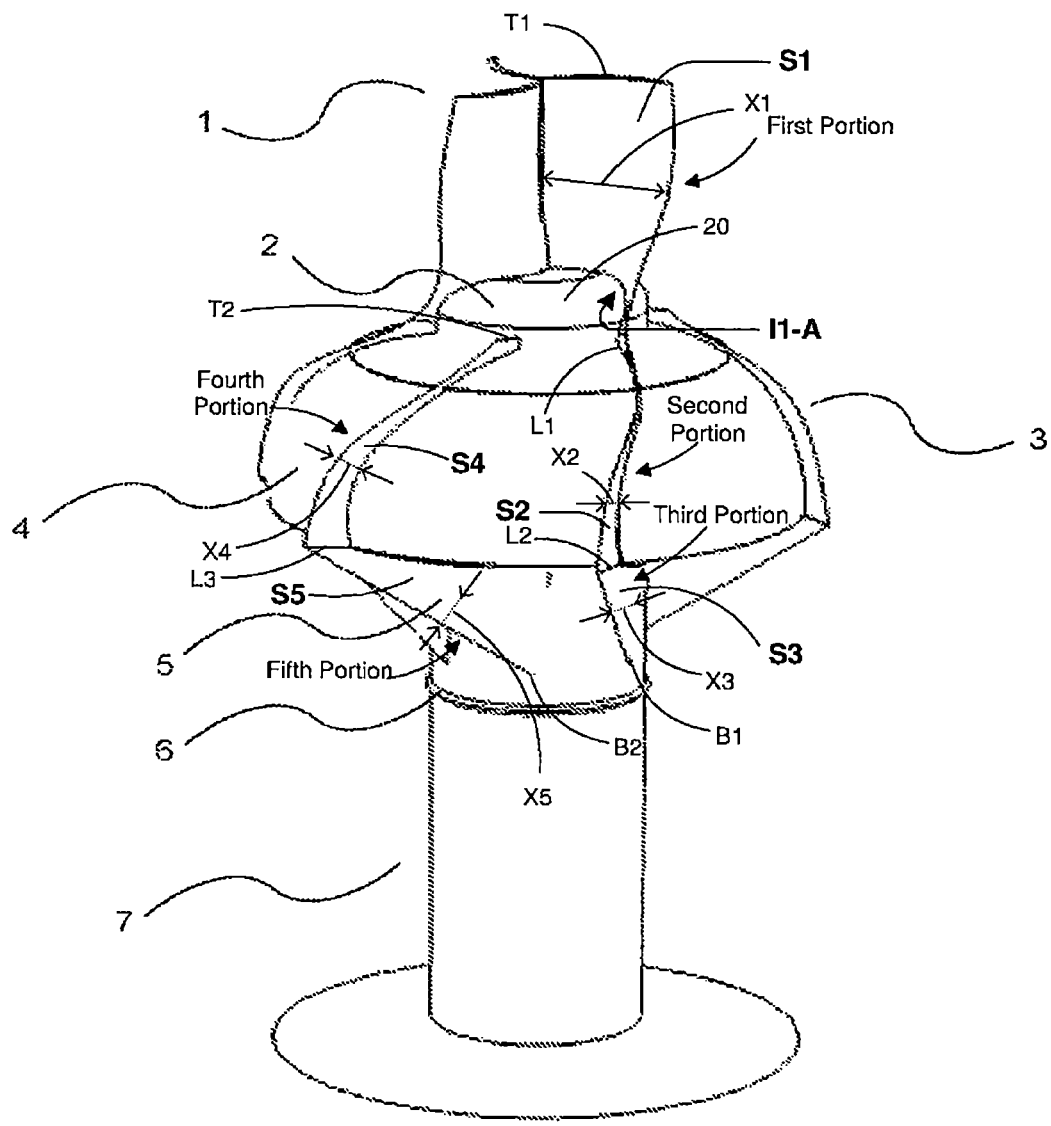
FIG. 1. Tower
FIG. 2 Turbine blades
FIG. 3. Top view of Tower
Figure 2:
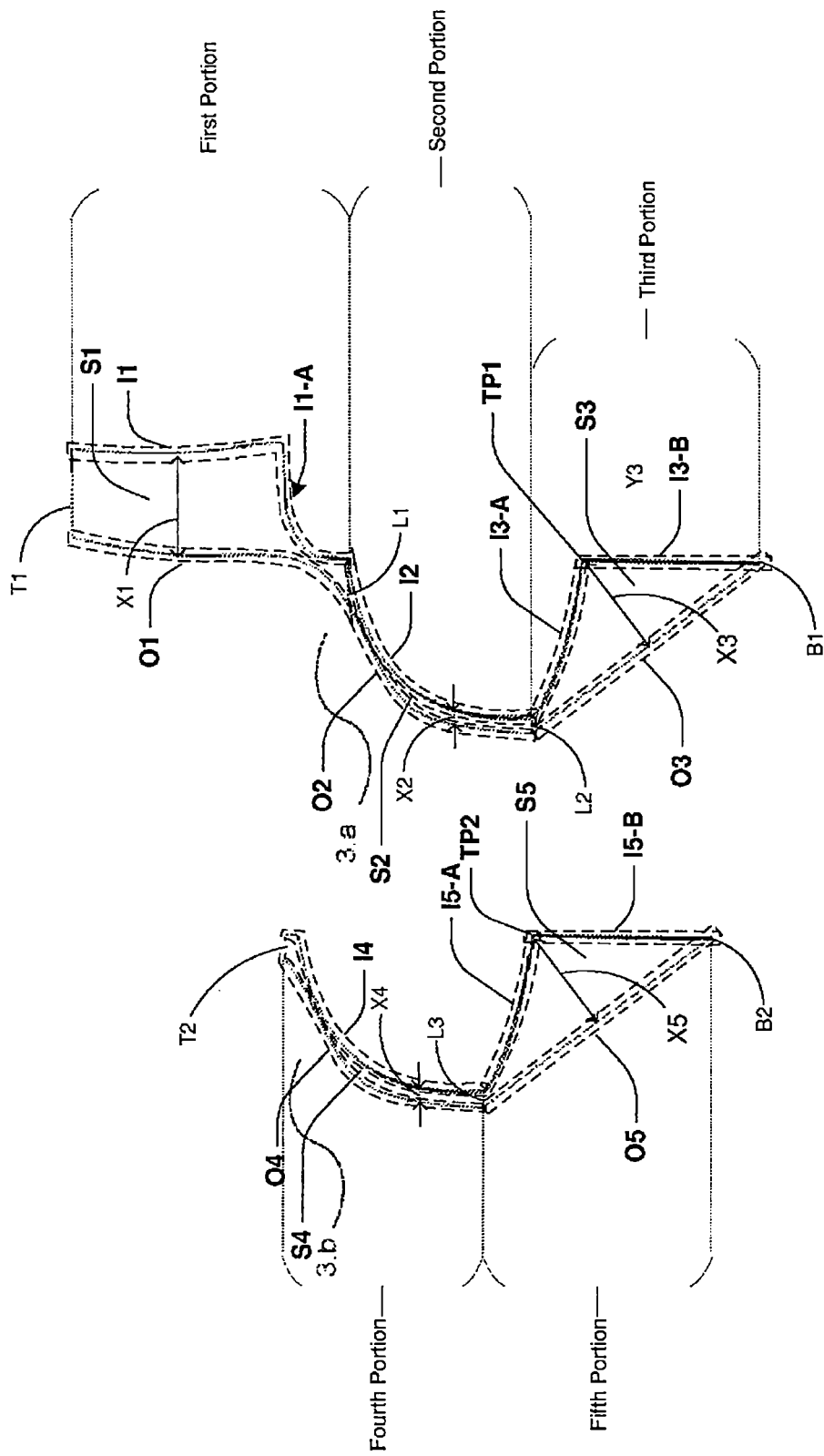

Three blades (1) are embedded in the top of the turbine, which is the upper part of the main blades (3.$a$). Lower and inside the container in roof of dome, the gearbox and generator (2) are located to which harnessed energy by blades is transferred.

The three main blades also are extended in the middle section (3) of the turbine. But for optimum utilization of wind energy, the turbine in the middle section also has three secondary blades (3.$b$). These three secondary blades start from the dome roof and end to under the dome plate. The same part where the power of the blades is transmitted to the gearbox and generator. The main and secondary blades are connected by a ring and indeed all blades act in integrated manner.

As a result, the middle part of the turbine has six blades. In this part and below the blades, the dome (4) is located. In order to use the surrounding landscape, this dome can be made of transparent glass. In fact, the lower part of the main and secondary blades are stiffeners (5) located under dome plate, which provide more stability for dome and their curvature helps harnessing much more wind energy. The structure rotates by a bearing (6) that can be embedded on the tube and below the dome plate.

Figure 3:
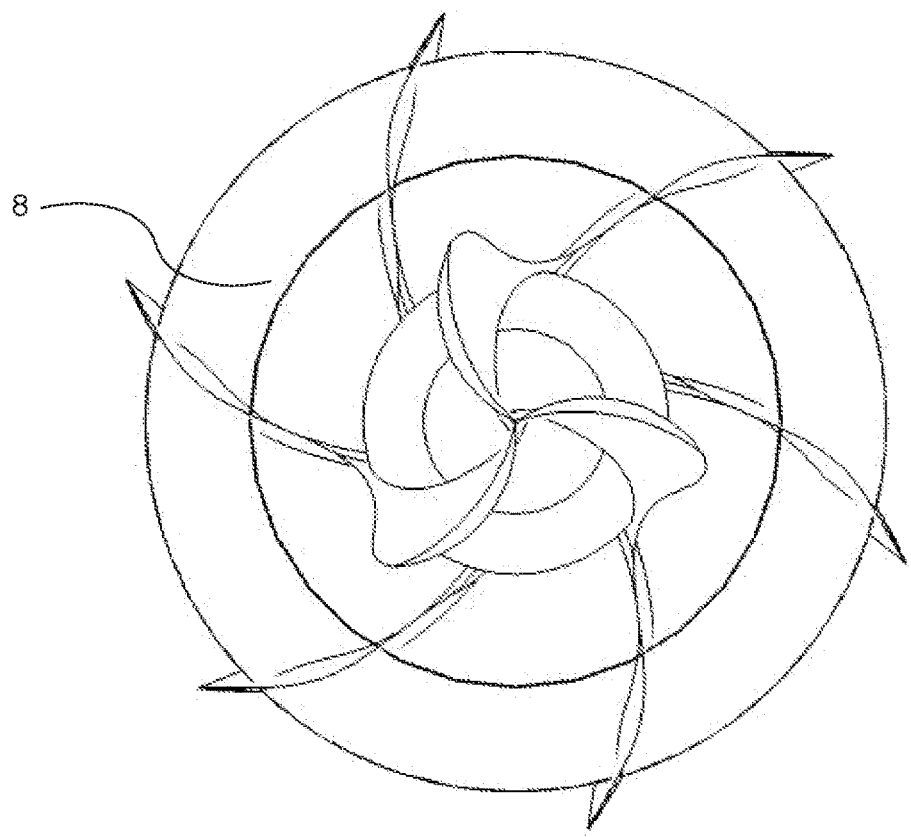

Under the glass dome plate which is placed on the tube, there are 6 stiffeners to provide stability for the dome on the tube, the curvature of which, according to FIG. 1, helps controlling more wind energy. The stiffener edge is connected to triple vertical blades on domes through those blades extended to around glass dome. In fact, a combination of three main blades (3$a$) and three secondary blades (3$b$) forms a specific blade every other (FIG. 3), which is responsible for tower structure rotation.

The integration of these three elements, including the stiffeners, the blades around the dome and the vertical blade (which altogether forms turbine blades), can harness the wind, rotate the structure, allowing seeing multiple landscapes as well as generating the energy required by the penthouse. In the tower, a hollow tube (7) is used as a pillar or base. It is also used as an elevator cabin to lift people to the penthouse.

The main Blades (3.$a$) consist of three parts:
1—upper part (1)—(vertical blade)
2—Middle part (3)—(which is located on the glass dome)
3—lower part (5)—(which is formed by the curvature of stiffener under the dome)

All of six blades are connected by one or more rings (8), making the blades act like a single blade.

The secondary Blades (3 $b$) consist of two parts:
1—Middle part (3)—(which is located on the glass dome)
2—lower part (5)—(which is formed by the curvature of the stiffener under the dome)

In fact, the lower part of the main and secondary blades are the stiffeners (5) located under dome plate, which provide more stability for dome and their curvature helps harnessing much more wind energy. This part in main blades extends vertically to the top of the dome. It should be noted that in order to harness much more wind, the blades (3) around the glass dome (4) should be slightly spaced from the glass dome.

The invention claimed is:
1. A tower equipped with a vertical domical turbine, the tower comprising:

a dome comprising a transparent material to provide visibility from inside the dome to outside the dome;
a first set of three blades, wherein each blade of the first set of three blades comprises:
  a first portion extending vertically from a first lateral section of the blade to a top of the blade, wherein:
    the first portion has:
      a first inner blade edge extending from the first lateral section of the blade to the top of the blade;
      a first outer blade edge extending from the first lateral section of the blade to the top of the blade; and
      a first blade surface extending from the first inner blade edge to the first outer blade edge;
    the first inner blade edge and the first outer blade edge overlie the dome; and
    the first inner blade edge has a curved portion that underlies the first blade surface and has a first convex curvature profile aligned with a roof of the dome such that the curved portion of the first inner blade edge conforms to the roof of the dome;
  a second portion extending from the first lateral section of the blade to a second lateral section of the blade at a lower elevation than the first lateral section of the blade, wherein:
    the second portion has:
      a second inner blade edge that is contiguous to the first inner blade edge and extends from the first lateral section of the blade to the second lateral section of the blade;
      a second outer blade edge that is contiguous to the first outer blade edge and extends from the first lateral section of the blade to the second lateral section of the blade; and
      a second blade surface extending from the second inner blade edge to the second outer blade edge; and
    the second inner blade edge has a second convex curvature profile aligned with the dome such that second inner blade edge conforms to the dome;
  a third portion extending from the second lateral section of the blade to a bottom of the blade, wherein:
    the third portion has:
      a third inner blade edge that is contiguous to the second inner blade edge and extends from the second lateral section of the blade to the bottom of the blade, the third inner blade edge comprising:
        a first curved edge portion that has a third convex curvature profile and extends from the second lateral section of the blade to a first turning point along the third inner blade edge; and
        a first linear edge portion that has a first linear profile and extends from the first turning point to the bottom of the blade;
      a third outer blade edge that is contiguous to the second outer blade edge and extends from the second lateral section of the blade to the bottom of the blade; and
      a third blade surface extending from the third inner blade edge to the third outer blade edge;
    the third portion is configured to provide stability for the dome; and
    the third outer blade edge has a second linear profile;
a second set of three blades, wherein each blade of the second set of three blades comprises:
  a fourth portion extending from a third lateral section of the blade to a top of the blade, wherein:
    the fourth portion has:
      a fourth inner blade edge extending from the third lateral section of the blade to the top of the blade;
      a fourth outer blade edge extending from the third lateral section of the blade to the top of the blade; and
      a fourth blade surface extending from the fourth inner blade edge to the fourth outer blade edge; and
    the fourth inner blade edge has a fourth convex curvature profile aligned with the dome such that the fourth inner blade edge conforms to the dome; and
  a fifth portion extending from the third lateral section of the blade to a bottom of the blade, wherein:
    the fifth portion has:
      a fifth inner blade edge that is contiguous to the fourth inner blade edge and extends from the third lateral section of the blade to the bottom of the blade, the fifth inner blade edge comprising:
        a second curved edge portion that has a fifth convex curvature profile and extends from the third lateral section of the blade to a second turning point along the fifth inner blade edge; and
        a second linear edge portion that has a third linear profile and extends from the second turning point to the bottom of the blade;
      a fifth outer blade edge that is contiguous to the fourth outer blade edge and extends from the third lateral section of the blade to the bottom of the blade; and
      a fifth blade surface extending from the fifth inner blade edge to the fifth outer blade edge;
    the fifth portion is configured to provide stability for the dome;
    the fifth outer blade edge has a fourth linear profile;
  the first set of three blades and the second set of three blades are configured to harness wind energy to be rotated;
  the rotation of the first set of three blades and the second set of three blades causes rotation of the dome to provide a rotating view of outside the dome from inside the dome; and
  blades of the first set of three blades are integrated with blades of the second set of three blades.

2. The tower of claim 1, comprising:
one or more rings extending around the dome, wherein the one or more rings are connected to each blade of the first set of three blades and the second set of three blades.

3. The tower of claim 1, wherein:
the first set of three blades and the second set of three blades are arranged such that each blade of the first set of three blades is between two blades of the second set of three blades.

4. The tower of claim 1, wherein:
the first set of three blades comprises a first blade and a second blade;
the second set of three blades comprises a third blade; and
the third blade is between the first blade and the second blade.

5. The tower of claim 1, comprising:
at least one of a gearbox or a generator configured to:
  receive harnessed energy harnessed using at least one of the first set of three blades or the second set of three blades; and
  provide electrical power.
6. The tower of claim 5, wherein:
at least one of the gearbox or the generator is disposed in a space defined by the dome.
7. The tower of claim 1, wherein:
the third portion of each blade of the first set of three blades acts as a stiffener to provide stability for the dome.
8. The tower of claim 1, wherein:
the fifth portion of each blade of the second set of three blades acts as a stiffener to provide stability for the dome.
9. The tower of claim 1, comprising:
a bearing configured to facilitate rotation of at least one of the first set of three blades, the second set of three blades, or the dome.
10. The tower of claim 9, wherein:
the bearing is coupled to a tube underlying the dome.
11. The tower of claim 10, wherein:
the tube comprises an elevator cabin.
12. The tower of claim 1, wherein:
the transparent material of the dome comprises glass; and
the rotating view of outside the dome from inside the dome is viewable to a person within the dome.
13. The tower of claim 1, comprising:
one or more rings extending around the dome, wherein the one or more rings are connected to each blade of the first set of three blades and the second set of three blades; and
at least one of a gearbox or a generator configured to:
  receive harnessed energy harnessed using at least one of the first set of three blades or the second set of three blades; and
  provide electrical power, wherein:
    the first set of three blades and the second set of three blades are arranged such that each blade of the first set of three blades is between two blades of the second set of three blades.
14. The tower of claim 13, wherein:
the third portion of each blade of the first set of three blades acts as a stiffener to provide stability for the dome; and
the fifth portion of each blade of the second set of three blades acts as a stiffener to provide stability for the dome.
15. The tower of claim 1, wherein:
a first length of extension of the first blade surface from a point along the first inner blade edge to a point along the first outer blade edge is greater than a second length of extension of the second blade surface from a point along the second inner blade edge to a point along the second outer blade edge;
a third length of extension of the third blade surface from the first turning point along the third inner blade edge to a point along the third outer blade edge is greater than the second length of extension of the second blade surface; and
a fifth length of extension of the fifth blade surface from the second turning point along the fifth inner blade edge to a point along the fifth outer blade edge is greater than a fourth length of extension of the fourth blade surface from a point along the fourth inner blade edge to a point along the fourth outer blade edge.

16. A tower equipped with a vertical domical turbine, the tower comprising:
a dome comprising a transparent material to provide visibility from inside the dome to outside the dome;
a first set of blades, wherein each blade of the first set of blades comprises:
  a first portion extending vertically from a first lateral section of the blade to a top of the blade, wherein:
    the first portion has:
      a first inner blade edge extending from the first lateral section of the blade to the top of the blade;
      a first outer blade edge extending from the first lateral section of the blade to the top of the blade; and
      a first blade surface extending from the first inner blade edge to the first outer blade edge;
    the first inner blade edge and the first outer blade edge overlie the dome; and
    the first inner blade edge has a curved portion that underlies the first blade surface and has a first convex curvature profile aligned with a roof of the dome such that the curved portion of the first inner blade edge conforms to the roof of the dome;
  a second portion extending from the first lateral section of the blade to a second lateral section of the blade at a lower elevation than the first lateral section of the blade, wherein:
    the second portion has:
      a second inner blade edge that is contiguous to the first inner blade edge and extends from the first lateral section of the blade to the second lateral section of the blade;
      a second outer blade edge that is contiguous to the first outer blade edge and extends from the first lateral section of the blade to the second lateral section of the blade; and
      a second blade surface extending from the second inner blade edge to the second outer blade edge;
    the second inner blade edge has a second convex curvature profile aligned with the dome such that second inner blade edge conforms to the dome; and
    a first length of extension of the first blade surface from a point along the first inner blade edge to a point along the first outer blade edge is greater than a second length of extension of the second blade surface from a point along the second inner blade edge to a point along the second outer blade edge;
  a third portion extending from the second lateral section of the blade to a bottom of the blade, wherein:
    the third portion has:
      a third inner blade edge that is contiguous to the second inner blade edge and extends from the second lateral section of the blade to the bottom of the blade, the third inner blade edge comprising:
        a first curved edge portion that has a third convex curvature profile and extends from the second lateral section of the blade to a first turning point along the third inner blade edge; and a first linear edge portion that has a first linear profile and extends from the first turning point to the bottom of the blade;
a third outer blade edge that is contiguous to the second outer blade edge and extends from the second lateral section of the blade to the bottom of the blade; and
a third blade surface extending from the third inner blade edge to the third outer blade edge;
a third length of extension of the third blade surface from the first turning point along the third inner blade edge to a point along the third outer blade edge is greater than the second length of extension of the second blade surface;
the third portion is configured to provide stability for the dome; and
the third outer blade edge has a second linear profile;
a second set of blades, wherein each blade of the second set of blades comprises:
a fourth portion extending from a third lateral section of the blade to a top of the blade, wherein:
the fourth portion has:
a fourth inner blade edge extending from the third lateral section of the blade to the top of the blade;
a fourth outer blade edge extending from the third lateral section of the blade to the top of the blade; and
a fourth blade surface extending from the fourth inner blade edge to the fourth outer blade edge; and
the fourth inner blade edge has a fourth convex curvature profile aligned with the dome such that the fourth inner blade edge conforms to the dome; and
a fifth portion extending from the third lateral section of the blade to a bottom of the blade, wherein:
the fifth portion has:
a fifth inner blade edge that is contiguous to the fourth inner blade edge and extends from the third lateral section of the blade to the bottom of the blade, the fifth inner blade edge comprising:
a second curved edge portion that has a fifth convex curvature profile and extends from the third lateral section of the blade to a second turning point along the fifth inner blade edge; and
a second linear edge portion that has a third linear profile and extends from the second turning point to the bottom of the blade;
a fifth outer blade edge that is contiguous to the fourth outer blade edge and extends from the third lateral section of the blade to the bottom of the blade; and
a fifth blade surface extending from the fifth inner blade edge to the fifth outer blade edge;
a fifth length of extension of the fifth blade surface from the second turning point along the fifth inner blade edge to a point along the fifth outer blade edge is greater than a fourth length of extension of the fourth blade surface from a point along the fourth inner blade edge to a point along the fourth outer blade edge;
the fifth portion is configured to provide stability for the dome; and
the fifth outer blade edge has a fourth linear profile;
the first set of blades and the second set of blades are configured to harness wind energy to be rotated;
the rotation of the first set of blades and the second set of blades causes rotation of the dome to provide a rotating view of outside the dome from inside the dome; and
blades of the first set of blades are integrated with blades of the second set of blades.

\* \* \* \* \*